(12) United States Patent
Shim (10) Patent No.: US 9,859,815 B2
(45) Date of Patent: Jan. 2, 2018

(54) ENERGY STORAGE SYSTEM (71) Applicant: LSIS CO., LTD., Anyang-si, Gyeonggi-do (KR)

(72) Inventor: Jae Seong Shim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 160 days.

(21) Appl. No.: 15/013,848

(22) Filed: Feb. 2, 2016

(65) Prior Publication Data

US 2016/0315468 A1 Oct. 27, 2016

(30) Foreign Application Priority Data

Apr. 27, 2015 (KR) .................. 10-2015-0059016

(51) Int. Cl.
  *H02M 7/44* (2006.01)
  *H02J 13/00* (2006.01)
  (Continued)

(52) U.S. Cl.
  CPC ............... *H02M 7/44* (2013.01); *H02J 3/32* (2013.01); *H02J 13/002* (2013.01);
  (Continued)

(58) Field of Classification Search
  CPC ........ H02M 7/44; H02M 3/18; H02J 13/0051; H02J 13/002; H02J 3/32; H02J 7/34;
  (Continued)

(56) References Cited

U.S. PATENT DOCUMENTS

2004/0160201 A1* 8/2004 Rahman ................ H02P 5/74
  318/41
2004/0264089 A1 12/2004 Furuya et al.
  (Continued)

FOREIGN PATENT DOCUMENTS

JP H09271176 10/1997
JP H10155240 6/1998
  (Continued)

OTHER PUBLICATIONS

Korean Intellectual Property Office Application Serial No. 10-2015-0059016, Office Action dated Sep. 6, 2016, 5 pages.
(Continued)

*Primary Examiner* — Jared Fureman
*Assistant Examiner* — Rafael Pacheco
(74) *Attorney, Agent, or Firm* — Lee, Hong, Degerman, Kang & Waimey (57) ABSTRACT

An energy storage system including a plurality of loads each converting direct current (DC) power stored in a battery thereof into alternating current (AC) power and outputting the AC power, a plurality of slave power controllers detecting zero crossing points of AC voltage signals output from one of the plurality of loads and controlling the plurality of loads in accordance with a control signal received from a master power controller, and the master power controller controlling the plurality of slave power controllers so as to control the plurality of loads in accordance with the control signal received from the master power controller after a preset time has lapsed since the detected zero crossing point.

8 Claims, 7 Drawing Sheets (51) Int. Cl.
*H02J 3/32* (2006.01)
*H02J 7/34* (2006.01)

(52) U.S. Cl.
CPC ............. *H02J 13/0051* (2013.01); *H02J 7/34* (2013.01); *Y02E 60/722* (2013.01); *Y02E 60/783* (2013.01); *Y02E 60/7815* (2013.01); *Y04S 10/14* (2013.01); *Y04S 40/121* (2013.01); *Y04S 40/123* (2013.01)

(58) Field of Classification Search
CPC ...... H02J 1/102; H02J 3/36; H02J 3/42; H02J 9/061; Y04S 40/121; Y04S 40/123; Y04S 10/14; Y02E 60/7815; Y02E 60/783; Y02E 60/722; Y02E 60/12
See application file for complete search history.

(56) References Cited

U.S. PATENT DOCUMENTS

| | | | |
|---|---|---|---|
| 2009/0073726 | A1 | 3/2009 | Babcock |
| 2009/0201650 | A1* | 8/2009 | Hauser ................... A01D 34/78 361/736 |
| 2009/0322154 | A1* | 12/2009 | Ichikawa ............. B60L 11/123 307/82 |
| 2010/0295382 | A1 | 11/2010 | Tae et al. |
| 2011/0157940 | A1* | 6/2011 | Zhang ................ H02M 1/4225 363/126 |

FOREIGN PATENT DOCUMENTS

| | | |
|---|---|---|
| JP | 2003-070167 | 3/2003 |
| JP | 2008-035665 | 2/2008 |
| JP | 2010-176292 | 8/2010 |
| JP | 2010273530 | 12/2010 |
| JP | 2010539886 | 12/2010 |
| JP | 2011-208975 | 10/2011 |
| JP | 2012125052 | 6/2012 |
| JP | 2013-240144 | 11/2013 |
| JP | 2014230454 | 12/2014 |
| KR | 10-2006-0115685 | 11/2006 |
| KR | 20140019629 | 2/2014 |
| KR | 20150029935 | 3/2015 |
| WO | 2014020645 | 2/2014 |

OTHER PUBLICATIONS

Korean Intellectual Property Office Application No. 10-2015-0059016, Office Action dated Mar. 7, 2017, 3 pages.
Japan Patent Office Application No. 2016-031999, Office Action dated Feb. 28, 2017, 3 pages.
Korean Intellectual Property Office Application No. 10-2015-0059016, Notice of Allowance dated May 11, 2017, 1 page.
Japan Patent Office Application Serial No. 2016-031999, Notice of Allowance dated Jul. 18, 2017, 3 pages.

* cited by examiner

ENERGY STORAGE SYSTEM

CROSS-REFERENCE TO RELATED APPLICATIONS

Pursuant to 35 U.S.C. §119(a), this application claims the benefit of earlier filing date and right of priority to Korean Patent Application No. 10-2015-0059016, filed on Apr. 27, 2015, the contents of which are hereby incorporated by reference herein in its entirety.

BACKGROUND

The present disclosure relates to an energy storage system and, more particularly, to an energy storage system which synchronizes a plurality of power controllers controlling loads.

With the development of industry, the power demand has increased. In addition, as a load gap between day and night and a power usage gap between seasons and holidays have gradually increased, the decline of a load factor is intensified.

Recently, for this reason, various load management techniques for reducing a peak load by using surplus electric power are developed, and a typical example of such techniques is a battery energy storage system.

The battery energy storage system stores surplus electric power at night or surplus electric power generated from wind power and solar light and supplies electric power to a load by discharging the stored electric power during a peak load or a system fault.

In this manner, it is possible to achieve the maximum load reduction and load leveling.

Recently, an emerging smart grid due to the emergence of various new and renewable energy sources may be used for such a battery energy storage system.

The energy storage system (or the battery power storage system) may include a plurality of loads which receive power from a system or supply power, a plurality of slave power controllers controlling the plurality of loads, and a master power controller controlling the plurality of slave power controllers.

Each slave power controller may transmit, to a load under control thereof, a control signal for controlling the load to be discharged or charged.

In a related art, when the slave power controllers transmit control signals, the slave power controllers and a master power controller controlling the same are not synchronized, so that each slave power controller may output the control signal at a different point in time, and accordingly, each load outputs power at a different point in time.

SUMMARY

Embodiments resolve the aforementioned issues and other issues. In addition, embodiments also aim to synchronize time of slave power controllers.

In one general aspect of the present disclosure, An energy storage system including: a plurality of loads each converting direct current (DC) power stored in a battery thereof into alternating current (AC) power and outputting the AC power; a plurality of slave power controllers detecting zero crossing points of AC voltage signals output from one of the plurality of loads and controlling the plurality of loads in accordance with a control signal received from a master power controller; and the master power controller controlling the plurality of slave power controllers so as to control the plurality of loads in accordance with the control signal received from the master power controller after a preset time has lapsed since the detected zero crossing point.

According to an embodiment of the present disclosure, a master power controller controls a plurality of slave power controllers without delay on a communication line to each of the plurality of slave power controllers, so that simultaneity and integration may be achieved.

In addition, according to an embodiment of the present disclosure, it is possible to output Pulse Width Modulation (PWM) signals output from a plurality of slave power controllers to respective loads, so that accuracy and integration of power output from the respective loads may be achieved.

DETAILED DESCRIPTION

All terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

This disclosure may, however, be embodied in many alternate forms and should not be construed as limited to the embodiments set forth herein. Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure as defined by the claims.

Hereinafter, a configuration of an energy storage system according to an embodiment of the present disclosure is described with reference to FIG. 1.

Figure 1:
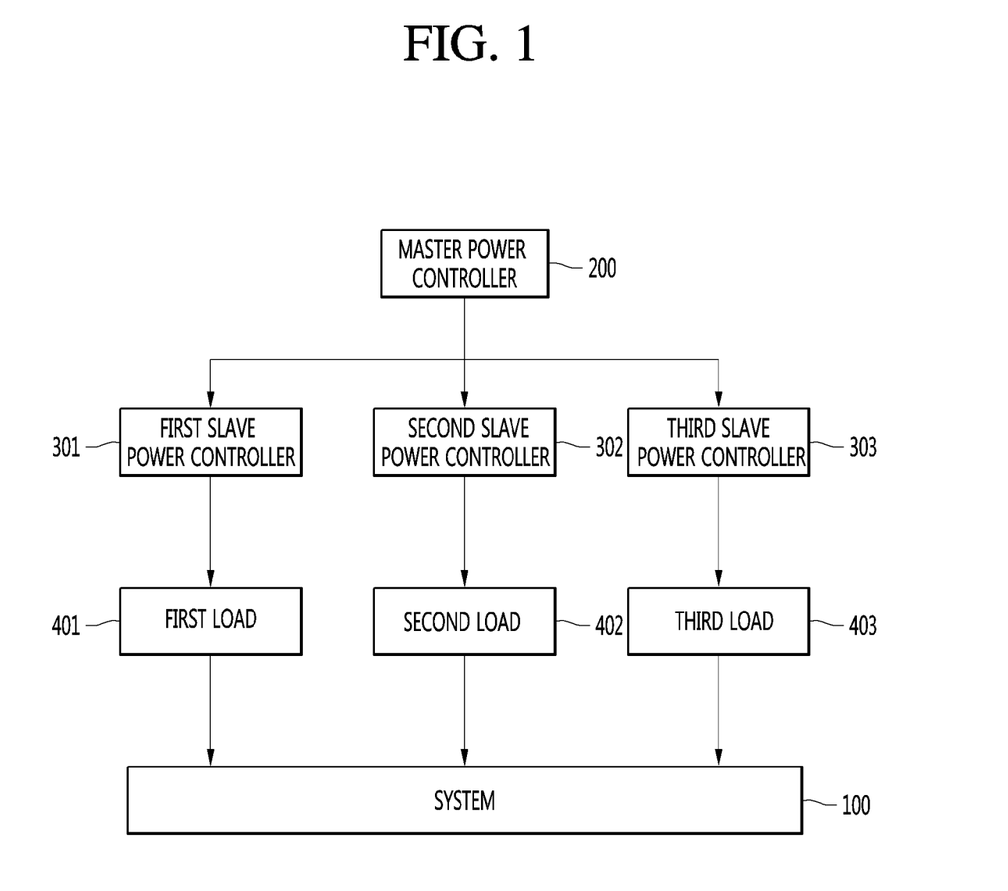
FIG. 1 is a block diagram illustrating a configuration of an energy storage system according to an embodiment of the present disclosure.

FIG. 1 is a block diagram illustrating a configuration of an energy storage system according to an embodiment of the present disclosure.

As shown in FIG. 1, an energy storage system may include a master power controller 200, a plurality of slave power controllers 301, 302, and 202, a plurality of loads 401, 402, and 403, and a system 100.

In addition, although not shown in FIG. 1, the energy storage system may include an energy management system (not shown) and at least one Programmable Logic Controller (PLC) module (not shown).

The energy management system may receive a specific control command from an upper level system (not shown) connected to the energy storage system.

When receiving the specific control command, the energy management system may generate another specific control command to be transmitted to a lower level system (e.g., the PLC module, a plurality of power controller, and a plurality of loads) preset to be managed by the energy management system.

When the specific control command to be transmitted to the lower level system is generated, the energy management system may transmit the generated specific control command to the PLC module.

The PLC module may receive the specific control command from the energy management system.

Based on the specific control command, the PLC module may generate a control command to be transmitted to the power controllers 200, 301, 302, and 303, which are preset to be managed by the PLC module.

Once the control command to be transmitted to the power controllers 200, 301, 302, and 303 are generated, the PLC module may transmit the generated control command to the power controllers 200, 301, 302, and 303.

A single PLC module may be able to control at least two power controllers and to receive state information of a lower level system (e.g., charging rate information of a load) from at least two power controllers.

The PLC module is used as a component for controlling the preset power controllers 200, 301, 302, and 303. There may be a complex sequence for each situation of a large-capacity energy storage system, and the PLC module may change the complex sequence into a system program to allow a user (or an operator) to use it easily.

As a single PLC module controls two or more power controllers, costs may be reduced.

In addition, the PLC module may separately remove and replace only a component where an error has occurred, and accordingly, more stable and efficient operation is possible.

For example, the Master-k program may be installed, and a user may execute the PLC module when the Master-k program is installed.

The power controllers 200, 301, 302, and 303 may receive state information of each of loads 401, 402, and 403 from the loads 401, 402, and 403 in a lower level system.

As an example of state information of each of the plurality of loads 401, 402, and 403, charging state information of a battery included in each of the loads 401, 402, and 403 may be included.

Once the state information of each of the loads 401, 402, and 403 is received from the loads 401, 402, and 403, the power controllers 200, 301, 302, and 303 may transmit the received state information to the PLC module.

In addition, the plurality of power controllers 200, 31, 302, and 303 may receive a control command from the PLC module in an upper level system.

Once the control command is received from the PLC module in the upper level system, the power controllers 200, 301, 302, and 303 may generate control commands to be transmitted to the loads 401, 402, and 403 in a lower level system.

Based on the control command received from the PLC module in the upper level system, the power controllers 200, 301, 302, and 303 may transmit the respective control commands to the plurality of loads 401, 402, 403.

Each of the plurality of loads 401, 402, and 403 may include a battery (now shown).

Each of the plurality of loads 401, 402, and 403 may generate state information of a battery included therein.

Once the state information of a battery is generated, the plurality of loads 401, 402, and 403 may transmit the generated state information to the plurality of power controllers of the upper level system.

The state information of a battery may include charging rate information and cell information of the battery, but aspects of the present disclosure are not limited thereto.

Hereinafter, a method of time synchronization of slave power controllers according to an embodiment of the present disclosure is described in detail with reference to FIG. 2.

Figure 2:
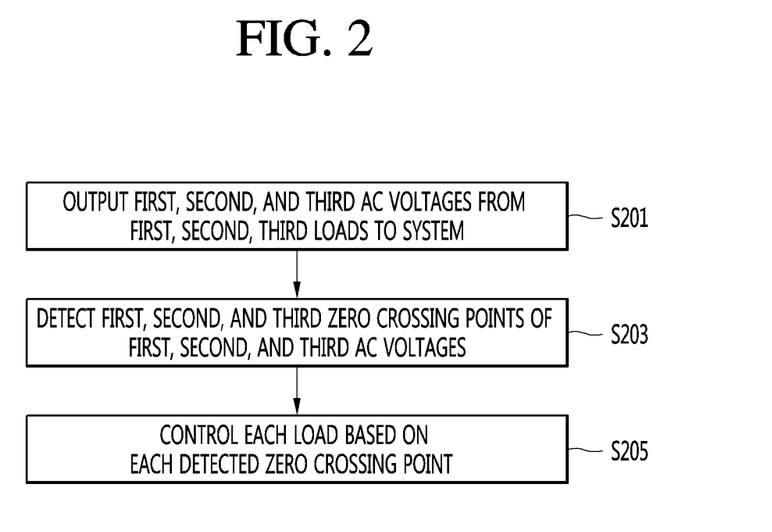
FIG. 2 is a flowchart illustrating a method of time synchronization of slave power controllers according to an embodiment of the present disclosure.

FIG. 2 is a flowchart illustrating a method of time synchronization of slave power controllers according to an embodiment of the present disclosure.

Referring to FIG. 2, a master power controller 200 out of a plurality of power controllers may periodically transmit a control signal to each load through a plurality of slave power controllers 301, 302, and 303.

The master power controller 200 may receive a specific control signal from a PLC module (not shown). Based on the received specific control signal, the master power controller 200 may generate a control signal for charging or discharging each load. The master power controller 200 may transmit the generated control signal to the slave power controllers 301, 302, and 303. Based on the received control signals received from the master power controller 200, the slave power controllers 301, 302, and 303 may transmit, to the loads 401, 402, and 403, voltage output commands (or voltage input commands) for charging or discharging the loads 401, 402, and 403.

When receiving the voltage output commands (or voltage input commands), the loads 401, 402, and 403 output a first alternating current (AC) voltage, a second AC voltage, and a third AC voltage to the system 100 in accordance with the voltage output commands (or voltage input commands) (S201).

Once the first AC voltage, the second AC voltage, and the third AC voltage are output from the loads 401, 402, and 403, the slave power controllers 301, 302, and 303, which are set to control the loads 401, 402, and 403, respectively, detect zero crossing points of the first AC voltage, the second AC voltage, and the third AC voltage (S203), respectively.

A zero crossing point may indicate a point in time when a phase value of each AC voltage reaches 0 degree (or 0 radian), but aspects of the present disclosure are not limited thereto.

Specifically, a first slave power controller 301 set to control a first load 401 may detect a first zero crossing point of the first AC voltage which is output from the first load 401 to a system 100. A second slave power controller 302 set to control a second load 402 may detect a second zero crossing point of the second AC voltage which is output from the second load 402 to the system 100. A third slave power controller 303 set to control a third load 403 may detect a third zero crossing point of the third AC voltage which is output from the third load 403 to the system 100.

Once the first zero crossing point, the second zero crossing point, and the third zero crossing point are detected, the first slave power controller 301, the second slave power controller 302, and the third slave power controller 303 control the first load 401, the second load 402, and the third load 403 based on the first zero crossing point, the second zero crossing point, and the third zero crossing point (S205).

Hereinafter, a method of time synchronization of a plurality of power controllers according to an embodiment of the present disclosure is described in detail with reference to FIG. 3.

Figure 3:
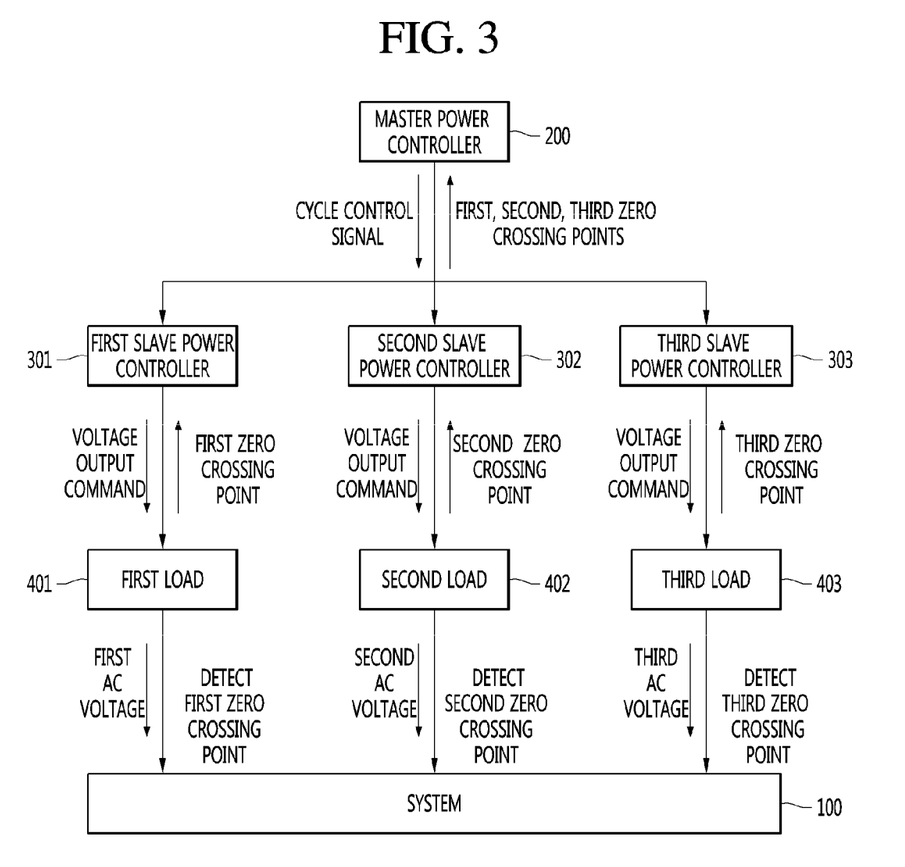
FIG. 3 is a block diagram illustrating a process of time synchronization of a master power controller and a plurality of slave power controllers according to an embodiment of the present disclosure.

FIG. 3 is a block diagram illustrating a process of time synchronization of a master power controller and a plurality of power controllers according to an embodiment of the present disclosure.

Referring to FIG. 3, a master power controller 200 may periodically transmit a control signal to a first slave power controller 301, a second slave power controller 302, and a third slave power controller 303.

When receiving the control signal, the first slave power controller 301 may transmit, to the first load 401 100, a voltage output command for outputting an AC voltage to the system 100. When receiving the control signal, the second power controller 302 and the third slave power controller 303 may transmit voltage output commands to the second load 402 and the third load 403.

When receiving the voltage output commands, the first load 401, the second load 402, and the third load 403 may transmit the first AC voltage, the second AC voltage, and the third AC voltage, respectively, to the system 100, and each of the first load 401, the second load 402, and the third load 403 has properties of AC power.

If the first AC voltage is periodically output from the first load 401 to the system 100, the first slave power controller 301 may detect a zero crossing point (or the first zero crossing point) of the first AC voltage output from the first load 401. If the second AC voltage is output from the second load 402 to the system 100, the second slave power controller 302 may detect a zero crossing point (or the second zero crossing point) of the second AC voltage output from the second load 402. Similarly, if the third AC voltage is output from the third load 403 to the system 100, the third slave power controller 303 may detect a zero crossing point (or the third zero crossing point) of the third AC voltage output from the third load 403.

Once the first zero crossing point, the second zero crossing point, and the third zero crossing point of the AC voltages output from the first load 401, the second load 402, and the third load 403 are detected, the first slave power controller 301, the second slave power controller 302, and the third slave power controller 303 may store the first zero crossing point, the second zero crossing point, and the third zero crossing point in respective storages (not shown) included therein.

When the first zero crossing point, the second zero crossing point, and the third zero crossing point are stored in the respective storages of the first slave power controller 301, the second slave power controller 302, and the third slave power controller 303, the first slave power controller 301, the second slave power controller 302, and the third slave power controller 303 may control the first load 401, the second load 402, and the third load 403 based on the stored zero crossing points. In addition, when the first zero crossing point, the second zero crossing point, and the third zero crossing point of AC voltages output from the first load 401, the second load 402, and the third load 403 are detected, the first slave power controller 301, the second slave power controller 302, and the third slave power controller 303 may transmit the first zero crossing point, the second zero crossing point, and the third zero crossing point to the master power controller 200.

Hereinafter, a method of controlling loads after time synchronization of power controllers is completed according to an embodiment of the present disclosure is described in detail with reference to FIGS. 4 to 7.

FIGS. 4 to 7 are block diagrams illustrating a process in which a master power controller simultaneously controls loads at through slave power controllers after time synchronization is completed according to an embodiment of the present disclosure.

Figure 4:
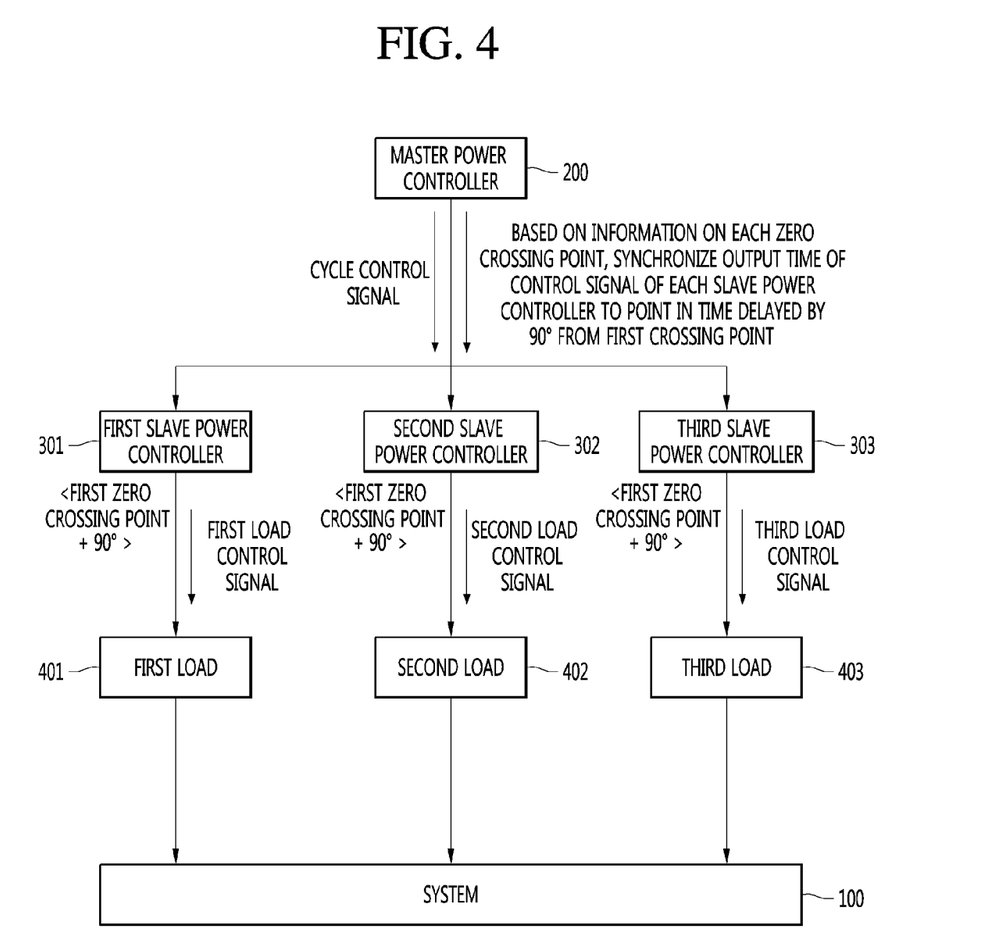
FIGS. 4 to 7 are block diagrams illustrating a process in which a master power controller simultaneously controls loads through slave power controllers after time synchronization is completed.

Referring to FIG. 4, if information on each zero crossing point is transmitted, a master power controller 200 may synchronize salve power controllers 301, 302, and 303 based on the received information on each zero crossing point.

By doing so, the master power controller 200 may enable the slave power controllers 301, 302, and 303 to receive a specific control signal transmitted from an upper level system and to simultaneously control loads 401, 402, and 403 after a predetermined period of time has lapsed since the first zero crossing point, thereby achieving synchronization of the entire energy storage system.

More specifically, based on the received information on each zero crossing point, the master power controller 200 may control the slave power controllers 301, 302, and 303 to synchronize time information which is necessary to operate the slave power controllers 301, 302, and 303.

Once the time information on the slave power controllers 301, 302, and 303 are synchronized, the slave power controllers 301, 302, and 303 may transmit control signals for controlling the loads 401, 402, and 403 to the loads 401, 402, and 403 based on the synchronized time information.

For example, as shown in FIG. 4, based on synchronized time information, in accordance with a control signal transmitted from the master power controller 200, a first slave power controller 301, a second slave power controller 302, and a third slave power controller 303 may synchronize an output time of control signals, which are for controlling a first load 401, a second load 402, and a third load 403 to perform a specific operation, to a point in time delayed by 90° from the first zero crossing point, and then may output the control signals to the first load 401, the second load 402, and the third load 403. More specifically, the first slave power controller 301, the second slave power controller 302, and the third slave power controller 303 may transmit voltage output commands (or discharging commands) to the first load 401, the second load 402, and the third load 403 to output power to the system 100, and then the first load 401, the second load 402, and the third load 403 may output AC voltages to the system 100 in accordance with voltage output commands generated based on synchronized time information (the first zero crossing point+90°).

In another example, in accordance with a control signal transmitted from the master power controller 200, the first slave power controller 301, the second slave power controller 302, and the third slave power controller 303 may simultaneously transmit Pulse Width Modulation (PWM) signals to the first load 401, the second load 402, and the third load 403 based on synchronized time information. When receiving the PWM signals, each of the first load 401, the second load 402, and the third load 403 may convert direct current (DC) power stored in a battery (not shown) included therein into AC power and transmit the AC power to the system 100.

Figure 5:
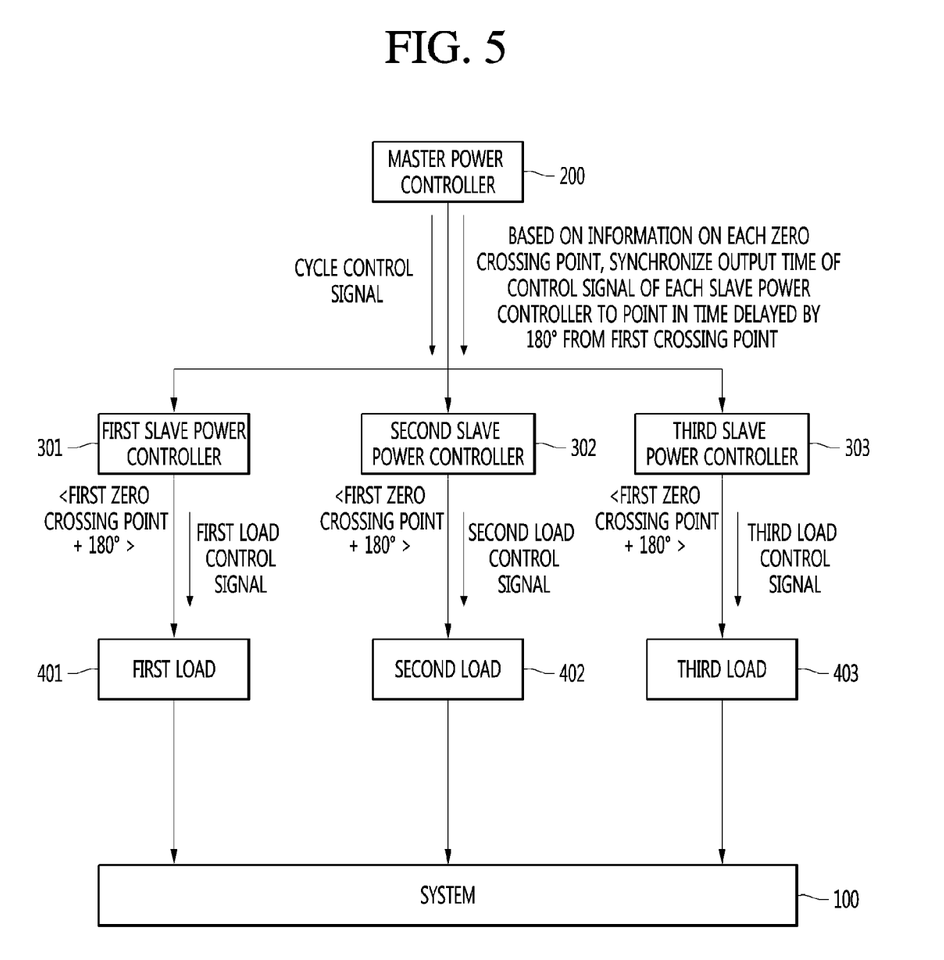

In addition, as shown in FIG. 5, based on synchronized time information, in accordance with a control signal transmitted from the master power controller 200, the first slave power controller 301, the second slave power controller 302, and the third slave power controller 303 may synchronize an output time of control signals, which are for controlling the first load 401, the second load 402, and the third load 403 to perform a specific operation, to a point in time delayed by 180° from the first zero crossing point, and then may output the control signals to the first load 401, the second load 402, and the third load 403.

More specifically, the slave power controllers 301, 302, and 303 may transmit voltage output commands (or discharging commands) to the loads 401, 402, and 403 to control the loads 401, 402, and 403 to output power to the system 100, and then, the loads 401, 402, and 403 may simultaneously output AC voltages to the system 100 in accordance with voltage output commands generated based on synchronized time information (the first zero crossing) point+180°.

Figure 6:
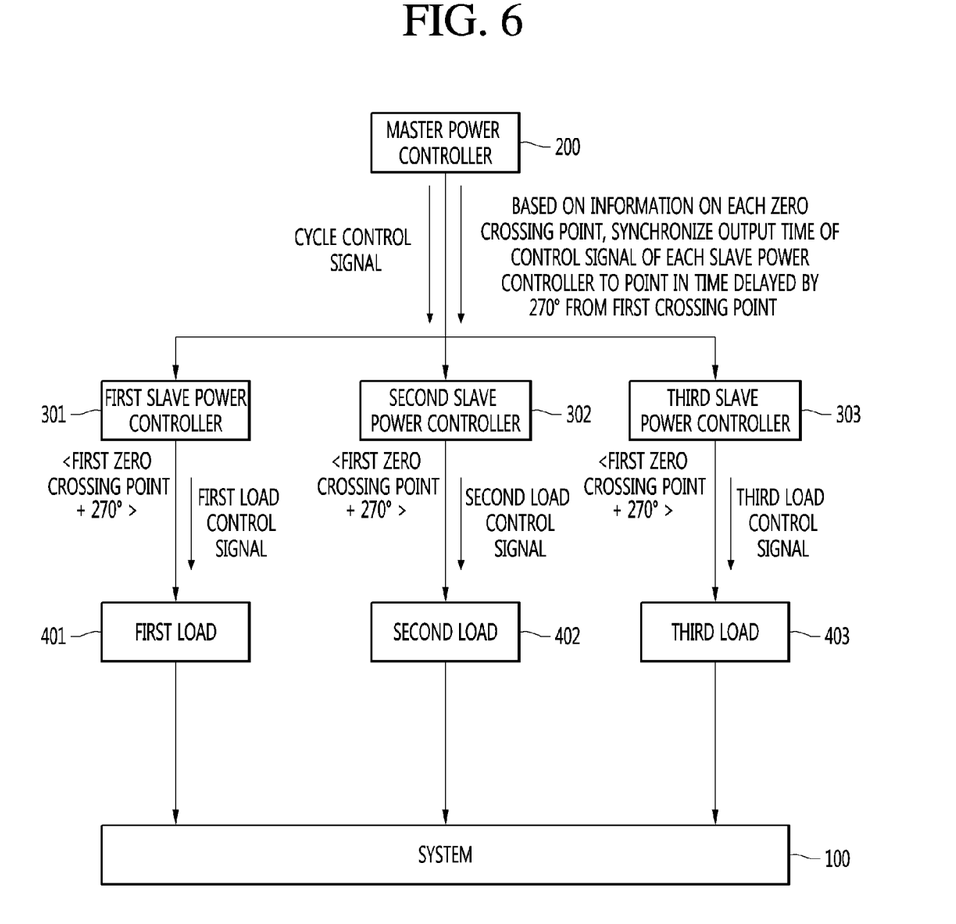

In another example, as shown in FIG. 6, based on synchronized time information, in accordance with a control signal transmitted from the master power controller 200, the first slave power controller 301, the second slave power controller 302, and the third slave power controller 303 may synchronize an output time of control signals, which are for controlling the first load 401, the second load 402, and the third load 403 to perform a specific operation, to a point in time delayed by 270° from the first zero crossing point, and then may output the control signals to the first load 401, the second load 402, and the third load 403. More specifically, the first slave power controller 301, the second slave power controller 302, and the third slave power controller 303 may transmit voltage output commands (or discharging commands) to the first load 401, the second load 402, and the third load 403 to control the first load 401, the second load 402, and the third load 403 to output power to the system, and then the first load 401, the second load 402, and the third load 403 may output AC voltages to the system 100 in accordance with voltage output commands generated based on synchronized time information (the first zero crossing point+270°).

Figure 7:
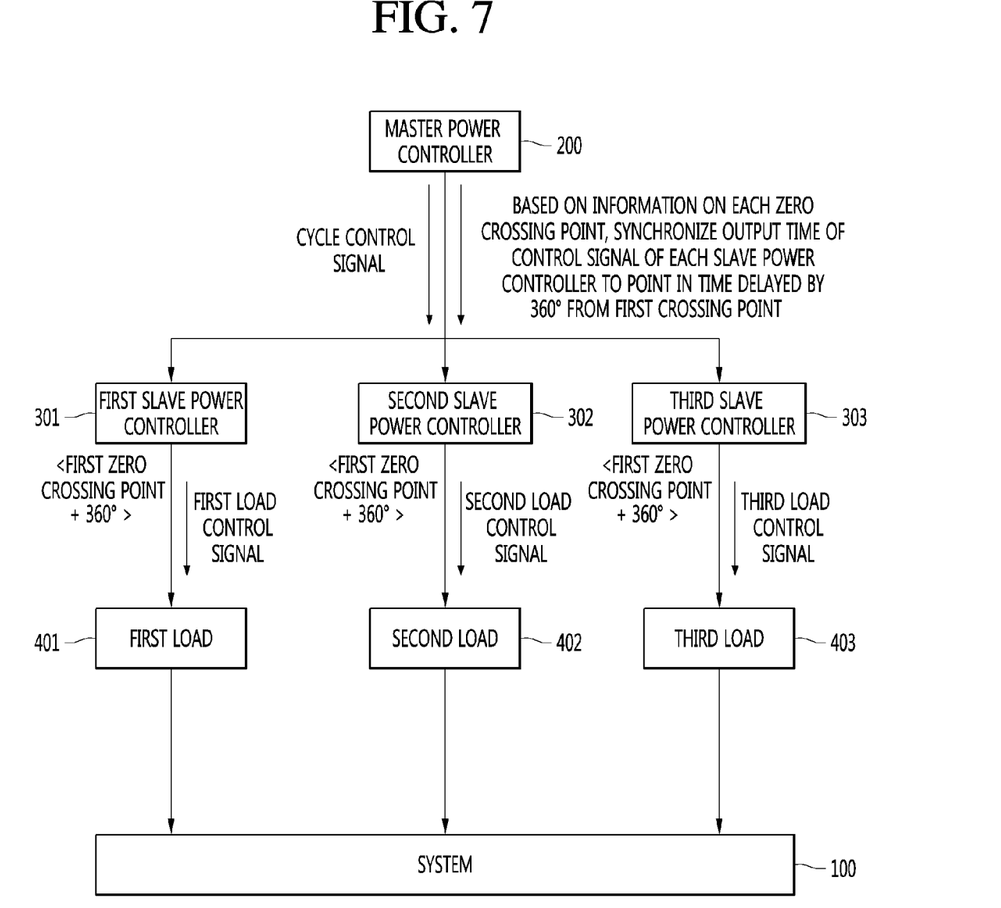

In another example, as shown in FIG. 7, based on synchronized time information, in accordance to a control signal transmitted from the master power controller 200, the first slave power controller 301, the second slave power controller 302, and the third slave power controller 303 may synchronize an output time of control signals, which are for controlling the first load 401, the second load 402, and the third load 403 to perform a specific operation, to a point in time delayed by 360° from the first zero crossing point, and then may output the control signals to the first load 401, the second load 402, and the third load 403.

More specifically, the first slave power controller 301, the second slave power controller 302, and the third slave power controller 303 may transmit voltage output commands (or discharging commands) to the first load 401, the second load 402, and the third load 403 to output power to the system 100, and the first load 401, the second load 402, and the third load 403 may simultaneously output AC voltages to the system 100 in accordance with voltage output commands generated based on synchronized time information (the first zero crossing point)+360°.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An energy storage system comprising:
a plurality of loads each converting direct current (DC) power stored in a battery thereof into alternating current (AC) power and outputting the AC power;
a plurality of slave power controllers detecting zero crossing points of AC voltage signals output from one of the plurality of loads and controlling the plurality of loads in accordance with a control signal received from a master power controller; and
the master power controller controlling the plurality of slave power controllers so as to control the plurality of loads in accordance with the control signal received from the master power controller after a preset time has lapsed since the detected zero crossing point.

2. The energy storage system of claim 1, wherein the plurality of slave power controller are synchronized based on the zero crossing points of the AC voltage signals output from the plurality of loads.

3. The energy storage system of claim 1, wherein the preset time is 90°, 180°, 270°, or 360°.

4. The energy storage system of claim 1, wherein the plurality of slave power controllers output Pulse Width Modulation (PWM) signals to the plurality of loads in accordance with the control signal received from the master power controller.

5. The energy storage system of claim 1, wherein the plurality of slave power controllers periodically detect the zero crossing points.

6. The energy storage system of claim 5, wherein the plurality of slave power controllers comprise a Central Processing Unit (CPU) which detects a period of time which has lapsed since the detection of the zero crossing points.

7. The energy storage system of claim 6, wherein the CPU periodically transmits the periodically detected zero crossing points to the master power controller.

8. The energy storage system of claim 7, wherein the master power controller periodically outputs the control signal based on the periodically transmitted zero crossing points.

* * * * *